UNITED STATES PATENT OFFICE.

EBENEZER MURDOCK, OF ALBANY, NEW YORK.

IMPROVEMENT IN CUTTING TOBACCO.

Specification forming part of Letters Patent No. 11,330, dated July 18, 1854.

*To all whom it may concern:*

Be it known that I, EBENEZER MURDOCK, of the city of Albany and State of New York, have invented a new and useful Process in the Manufacture of Cut Tobacco; and I do declare the following specification to be a full and complete description of said process.

The tobacco-leaf is first separated from the stem. The stems are then cut or chopped up in pieces of a small size, the size being determined by practice and experiment. When this is done, then these cut-up stems are to be carefully distributed between the leaves as they are put down and packed in the cutting-boxes, and then pressed. The whole is then cut up with the usual machinery. This being done, the tobacco is taken out and thoroughly dressed up, which dressing separates the stems from the leaf-cut. The leaf-cut is then put up in packages for sale, and the stem-cuttings disposed of for the usual purposes.

My improvement consists in the introduction of the cut stems with the leaves in the operation of cutting the leaves.

It is found in practice that from the glutinous or gummy matter existing in the tobacco-leaf the process of cutting it up properly is a difficult one, and various methods have been adopted to obviate the difficulty, but none which in a long practice of cutting tobacco I have become acquainted with has ever proved successful until I adopted the above-described process of combining the cut stems with the leaf. This has made a very great practical and economical difference in the operation.

I therefore claim as my invention and desire to secure by Letters Patent—

The process of manufacturing cut tobacco by mixing with the leaves, as stripped of their stems for cutting, the stems previously cut up to a certain degree of fineness, the object being to facilitate by the use of said stems the advantageous cutting of the leaf itself, the mixed mass then to be cut up together to the requisite fineness, and then the stems to be separated from the cut leaf, which is then ready for use.

EBENEZER MURDOCK.

Witnesses:
RICHD. VARICK DE WITT,
JAMES B. SANDERS.